United States Patent [19]

Ballweber

[11] 4,335,237

[45] Jun. 15, 1982

[54] ADIABATIC POLYMERIZATION OF ACRYLAMIDE IN THE PRESENCE OF SODIUM SULFATE DECAHYDRATE

[75] Inventor: Edward G. Ballweber, Glenwood, Ill.

[73] Assignee: Nalco Chemical Company, Oak Brook, Ill.

[21] Appl. No.: 173,108

[22] Filed: Jul. 28, 1980

[51] Int. Cl.$^3$ .......................... C08F 2/00; C08F 20/56
[52] U.S. Cl. .................................. 526/234; 526/63; 526/91; 526/195; 526/210; 526/218; 526/233; 526/910; 526/303.1
[58] Field of Search ............ 526/233, 234, 210, 91–94, 526/910, 303, 195, 63

[56] References Cited

U.S. PATENT DOCUMENTS

| | | | |
|---|---|---|---|
| 2,380,617 | 7/1945 | Stewart et al. | 526/94 |
| 2,579,908 | 12/1951 | Davidson et al. | 526/909 |
| 2,745,823 | 5/1956 | Hewitt | 526/233 |
| 2,810,716 | 10/1957 | Markus | 526/232.1 |
| 3,050,505 | 8/1962 | Litterio | 526/234 |
| 3,213,069 | 10/1965 | Rausch | 526/234 |
| 3,288,770 | 11/1966 | Butler | 526/212 |
| 3,336,270 | 8/1967 | Monagle | 526/234 |
| 3,405,106 | 10/1968 | Scanley | 526/303 |
| 3,414,552 | 12/1968 | Scanley | 526/303 |
| 3,442,880 | 5/1969 | White | 526/234 |
| 3,658,772 | 4/1972 | Volk et al. | 526/303 |
| 3,668,194 | 6/1972 | Shen | 526/234 |
| 3,872,063 | 3/1975 | Kim | 526/210 |
| 4,113,934 | 9/1978 | Panzer et al. | 526/258 |
| 4,164,612 | 8/1979 | Suzuki et al. | 526/234 |

FOREIGN PATENT DOCUMENTS

| | | | |
|---|---|---|---|
| 37-6739 | 7/1962 | Japan | 526/234 |
| 40-15828 | 7/1965 | Japan | 526/210 |
| 51-28186 | 3/1976 | Japan | 526/233 |
| 841127 | 7/1960 | United Kingdom | 526/303 |

Primary Examiner—Herbert J. Lilling
Attorney, Agent, or Firm—Richard L. Johnston

[57] ABSTRACT

Polymers are prepared from a vinyl monomer or monomers by a homopolymerization or a copolymerization reaction which occurs exothermically, said reaction being carried out by mixing the vinyl monomer or monomers with an additive comprising an endothermic compound which is unreactive with said monomer or monomers and the resultant homopolymers or copolymers and has a phase transition point at the temperature of the polymerization reaction with the absorption of heat, the amount of said endothermic compound being sufficient to counterbalance the major part of the exothermic heat of reaction, the process being especially useful for preparing polymers in solid form or for preparing high solid suspensions of polymers.

2 Claims, No Drawings

ADIABATIC POLYMERIZATION OF ACRYLAMIDE IN THE PRESENCE OF SODIUM SULFATE DECAHYDRATE

BACKGROUND

Various methods have heretofore been used for the preparation of homopolymers or copolymers from vinyl monomers or mixtures of vinyl monomers. In the past, such homopolymers or copolymers have generally been used in the form of solutions, suspensions or emulsions containing a liquid phase, for example, water. The preparation of polymers or copolymers from vinyl monomers or compositions having a high solids concentration of such homopolymers or copolymers presents problems due to the fact that polymerization reactions are highly exothermic, thereby causing run-away reactions which are difficult to control. This problem applies in general to polymer production or the production of high polymer solid compositions by well recognized methods such as thin film polymerization, "jello" polymerization and suspension polymerization.

In U.S. Pat. No. 4,164,612 solid water soluble polymers in a grindable glassy state are prepared by reacting a mixture of a specific type of vinyl monomer and water in an amount of 7% to 18% by weight based on the total weight of the monomer, and adding a water soluble salt in a powdery form. Various types of water soluble salts are employed. The water content is said to be critical. If the water content is less than 7% by weight, the polymerization operation becomes difficult to carry out resulting in a non-uniform polymerization while, if the water content in the polymerization system exceeds 18% by weight, the solubility of the salt is increased to give an adverse effect in the polymerization. Also, the softening point of the polymer is lowered to make the polymer difficult to grind. Sodium chloride and crystals of anhydrous sodium sulfate are used in the examples to illustrate the practice of the process. The reaction is carried out under anaerobic conditions in a container placed in a bath designed to allow the bath temperature to accord with the internal temperature of the container and the bath temperature is adjusted so as to remain equal to the internal temperature of the container. In a typical polymerization the initial temperature was 20° C. The polymerization started 30 minutes after the addition of polymerization initiator. Seventy-five minutes elapsed before the maximum temperature of 114° C. was reached. The polymerization system was maintained at this temperature for one hour. The container was then taken out of the bath and allowed to stand at room temperature for two days and two nights. Then the polymer was crushed by a jaw crusher for rough grinding and then by a hammer mill for fine grinding. It is apparent that this type of process requires a considerable amount of control of temperature conditions. Furthermore, the amount of water present must also be controlled.

It will be apparent that there is a need for a process of preparing polymers from a vinyl monomer or monomers by a homopolymerization or a copolymerization reaction wherein the temperature of reaction can be controlled more readily and wherein solid polymers or compositions containing a high percentage of solid polymers can be produced.

BRIEF SUMMARY OF THE INVENTION

In accordance with the present invention polymers are prepared from a vinyl monomer or monomers by a homopolymerization or a copolymerization reaction which occurs exothermically, said reaction being carried out by mixing the vinyl monomer or monomers with an additive comprising an endothermic compound which is unreactive with said monomer or monomers and the resultant homopolymers or copolymers and has a phase transition point at the temperature of the polymerization reaction with the absorption of heat, the amount of said endothermic compound being sufficient to counterbalance the major part of the exothermic heat of reaction, the process being especially useful for preparing polymers in solid form or for preparing high solid suspensions of polymers.

DETAILED DESCRIPTION OF THE INVENTION

The practice of the invention is preferably illustrated by using acrylamide as the vinyl monomer to prepare polyacrylamide. However, the invention is applicable to many different types of polymerizations of vinyl monomers to produce homopolymers or copolymers including, for example, the polymerization or copolymerization of vinyl monomers of the type described in U.S. Pat. Nos. 3,288,770, 4,113,934 and 4,164,612, and British Pat. No. 1,489,046, all of which are incorporated herein by reference and made a part hereof. These patents disclose both water soluble monomers and oil soluble monomers. Although the present invention is illustrated by using acrylamide as the starting vinyl monomer, it is also applicable to any of the vinyl monomers or mixture of monomers in the aforementioned patents.

The invention can be practiced with oil continuous phase emulsification and with water continuous phase emulsions. The suspension or emulsion polymerizations can be carried out with oil soluble monomers such as, for example, styrene, butadienestyrene and acrylonitrile and water soluble monomers such as, for example, acrylamide, acrylic acid, dimethylaminoethylmethacrylate, diallyldimethyl ammonium chloride and other vinyl water soluble quaternary compounds made by using methyl chloride and methyl sulfate as the quaternizing agent.

In a typical process carried out in the practice of the invention, the monomer or monomers and an endothermic compound such as, for example, sodium sulfate decahydrate, are mixed. Sodium sulfate decahydrate is a slush at 27° C. The resultant suspension or slurry is quite fluid even when solid acrylamide has been charged to it. After the catalyst is added and after the first 25–50% polymerization has occurred, the slurry becomes an extrudable gel which is more or less solid and normally rubbery. However, polymerization will normally continue until the reaction is complete. If desired, the reaction product can be recovered by extruding it in any predetermined form directly from the reaction vessel.

The process is also carried out in the presence of a polymerization initiator of which there are many different types such as, for example, persulfates, mixtures of persulfates, and bisulfites, tertiary butyl hydroperoxide, and oil and water soluble azo compounds, e.g., 2,2'-azobis(isobutyronitrile).

The endothermic compound which is preferred for the practice of the invention is sodium sulfate decahydrate ($Na_2SO_4.10H_2O$) which has a melting point of 32° C. and loses water at 100° C. This is ideal for reactions where the temperature of the reaction mixture is gradually raised from a point below 32° C. through the 32° C. transition temperature of the sodium sulfate decahydrate whereby as the exothermic polymerization occurs the heat given off during the polymerization is counterbalanced by the heat taken up by the transition of the endothermic compound from the hydrous stage to the anhydrous stage. The amount of the endothermic compound, therefore, should be sufficient to counterbalance the major part of the exothermic heat of reaction thereby preventing a run-away reaction and making it unnecessary to supply delicate controls or to carry out the polymerization in stages as has been done in the past. In most cases it is preferable that the endothermic compound be endothermic at temperatures within the range of 30°–80° C.

Examples of endothermic compounds that can be employed in the practice of the invention are given in the following table:

TABLE

| Material | M.P. | Temperature (°C.) Where $H_2O$ is Lost | ΔH (cal/mole) |
|---|---|---|---|
| Sodium acetate . $3H_2O$ | 58 | 120 | 26040 |
| $BO_2 . 4H_2O$ | 57 | — | — |
| $Na_2B_4O_7 . 10H_2O$ | 75 | 200 | — |
| $Na_2CO_3 . 10H_2O$ | 32 | 100 | 16470 ($-3H_2O$) |
| $Na_2CO_3 . H_2O$ | — | 100 | 13800 |
| $NaH_2PO_4 . 2H_2O$ | 60 | — | — |
| $Na_2HPO_4 . 12H_2O$ | 34.6 | 180 | 56100 ($-5H_2O$) |
| $Na_2HPO_3 . 5H_2O$ | 53 | 120 | — |
| $NaH_2PO_3 . 5H_2O$ | 42 | 100 | — |
| $NaKC_4H_4O_6 . 4H_2O$ | 70–80 | 215 | — |
| $Na_2SO_4 . 10H_2O$ | 32 | 100 | 192600 |
| $Na_3PO_4 . 12H_2O$ | 73.4 | — | — |
| $Na_2SiO_3 . 5H_2O$ | 72.2 | — | — |
| $MnSO_4 . 5H_2O$ | 26 | — | — |

The invention is not limited to the use of hydrated salts as endothermic compounds. Any compound which has a transition point from one phase to another with the absorption of heat can be employed. However, a preferred compound is sodium sulfate decahydrate.

The invention will be further illustrated but is not limited by the following examples in which the quantities are given in parts by weight unless otherwise indicated.

EXAMPLE I

A polymerization process was carried out using 290 parts $Na_2SO_4.10H_2O$, 80 parts acrylamide and 0.29 part of 2,2'-azobis(isobutyronitrile) (dissolved in 10 parts dimethyl formamide) at 30° C. Once initiated the slurry of reactants thickened and became unstirrable. After standing over night at room temperature, the non-tacky, rubbery mass was removed in one piece and a portion was cut off and dissolved directly in water which produced at 1% active solution. The product, 18% solids, had an intrinsic viscosity of 14.4, a silica settling replacement ratio of 0.8, and contained 2.8% unreacted acrylamide, based on the charge. The product could be extruded easily through a small (approximately 1 liter) stainless steel reactor with a screw extruder built into the bottom of the reactor.

A product with 45% polymer solids would require the use of 0.5 pound sodium sulfate decahydrate per pound of acrylamide, but would require removal of only 0.67 pound of water per pound of acrylamide for a "jello" polymer, to obtain a dry product. The product appeared to be easier to handle than the "jello" polymer and qualitatively the rate of solution appeared to be vastly improved.

EXAMPLE II

Use of oil such as mineral oil and a dispersing aid results in a fluid system that can be handled throughout the course of the polymerization in conventional equipment. The dispersing aid serves to keep the polymer particles separated during polymerization.

Redox initiated polymerizations were conducted using crystalline acrylamide together with $Na_2SO_4.10H_2O$ as the endothermic compound, in mineral oil as a suspending agent and in the presence of various dispersants to keep the polymer particles separated. Various molar ratios of acrylamide to decahydrate were employed in a range of 2:1 to 4:1.

Proper choice of dispersants is conditioned by two factors: (1) ability to prevent agglomeration or gelation of the polymerizing mass; and (2) a necessary lack of emulsification of the water released in dehydration of the decahydrate, so as to prevent emulsion polymerization of acrylamide. The dispersants were determined empirically using dispersants alone or in combination with one another. With a molar ratio of acrylamide to decahydrate within the range of 2:1 to 4:1 sorbitan monooleate (Span 80) was found to be a workable dispersant but with some oil hang-up. With an acrylamide-decahydrate molar ratio of 3:1 to 4:1 a combination of sorbitan monooleate (Span 80) and sorbitan trioleate (Tween 85) was found to be workable. On the other hand, with a molar ratio of acrylamide-decahydrate of 2:1 using sorbitan trioleate (Tween 85) alone, the system was emulsified.

A combination of sorbitan monooleate (Span 80) and octyl phenoxy polyethoxy ethanol (Triton X45) at a molar ratio of 4:1 gave a gel-like product.

With a molar ratio of acrylamide to decahydrate of 3:1 to 4:1 a combination of sorbitan monooleate (Span 80) and stearyl dimethyl benzyl ammonium chloride (Triton X-400) gave a workable polymerization mixture.

In carrying out the suspension polymerization process using a molar ratio of acrylamide to sodium sulfate decahydrate of 2:1, 71 parts of crystalline acrylamide and 161 parts of sodium sulfate decahydrate were charged into a reactor vessel containing 150 parts of mineral oil, 20 parts of Span 80, and 0.12 part of a redox catalyst (0.04 part sodium persulfate and 0.08 part nitrilo trispropionamide) was added to initiate the reaction which took place at a temperature starting around 17° C. and rising to 32° C. At the end of the polymerization the solid was filtered from the oil and recovery of each phase was noted. In addition, a small amount of solid was washed with acetone to free any water and oil. Aqueous solutions (1% by weight) were made of each material using the theoretical basis that isolated solid contained sodium sulfate plus water plus polymer while dried solid contained only sodium sulfate plus polymer. The weight ratio of charged oil to recovered oil was 170:131.6. The weight ratio of charged solid to recovered solid was 232:215.6. The intrinsic viscosity of the resultant polymer was 11.2.

In a similar manner the process was carried out using a molar ratio of acrylamide to decahydrate of 3:1 and a molar ratio of acrylamide to decahydrate of 4:1 (samples prepared at a 3:1 molar ratio acrylamide to decahydrate were completely water soluble while those made with a 4:1 molar ratio of acrylamide to decahydrate showed some gel particles). Intrinsic viscosities varied from about 8.7 to about 14.7.

It will be understood that the quantities of oil used as a suspending agent may vary depending upon what is necessary to constitute a workable reaction mixture.

The invention is susceptible to considerable modification and variation in its practical application depending upon the polymerization system used and the type of monomer or mixtures of monomers employed.

The invention is hereby claimed as follows:

1. In a process of preparing acrylamide polymers by a polymerization reaction which occurs exothermically, the improvement which comprises mixing acrylamide monomer with sodium sulfate decahydrate and effecting the polymerization reaction at a temperature such that said sodium sulfate decahydrate is heated to its melting point, the amount of sodium sulfate decahydrate being sufficient to counterbalance the major part of the exothermic heat of reaction.

2. A process as claimed in claim 1 in which said acrylamide monomer and said sodium sulfate decahydrate are suspended in a liquid suspending agent which is unreactive with said acrylamide monomer and the resultant polymers and the polymerization is carried out in the presence of a dispersant which is effective to keep the polymer particles separated during polymerization, the molar ratio of acrylamide monomer to sodium sulfate decahydrate being within the range of 2:1 to 4:1.

* * * * *